(12) United States Patent
Heo et al.

(10) Patent No.: US 8,828,594 B2
(45) Date of Patent: Sep. 9, 2014

(54) BATTERY PACK

(75) Inventors: Sangdo Heo, Suwon-si (KR); Woojin Lee, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 664 days.

(21) Appl. No.: 12/873,497

(22) Filed: Sep. 1, 2010

(65) Prior Publication Data

US 2011/0064974 A1    Mar. 17, 2011

(30) Foreign Application Priority Data

Sep. 14, 2009    (KR) .................. 10-2009-0086306

(51) Int. Cl.
| | | |
|---|---|---|
| *H01M 2/00* | (2006.01) | |
| *H01M 2/10* | (2006.01) | |
| *H01M 2/04* | (2006.01) | |
| *H01M 10/42* | (2006.01) | |
| *H01M 2/02* | (2006.01) | |

(52) U.S. Cl.
CPC .......... *H01M 2/1016* (2013.01); *H01M 2/0207* (2013.01); *Y02E 60/12* (2013.01); *H01M 2/0469* (2013.01); *H01M 10/425* (2013.01)
USPC .............................. 429/163; 429/7

(58) Field of Classification Search
USPC .................. 429/7, 174, 163; 29/623.1, 623.3
See application file for complete search history.

(56) References Cited

U.S. PATENT DOCUMENTS

| | | |
|---|---|---|
| 7,550,227 B2 | 6/2009 | Yoon |
| 7,592,096 B2 | 9/2009 | Jung et al. |
| 2005/0175889 A1 | 8/2005 | Han |
| 2006/0071637 A1 | 4/2006 | Heo et al. |
| 2006/0073384 A1* | 4/2006 | Heo et al. ............. 429/176 |
| 2008/0107964 A1* | 5/2008 | Choi .................... 429/174 |
| 2008/0118825 A1* | 5/2008 | Yoon .................... 429/122 |
| 2008/0176134 A1 | 7/2008 | Kim |

(Continued)

FOREIGN PATENT DOCUMENTS

| | | |
|---|---|---|
| CN | 1828979 A | 9/2006 |
| CN | 101192658 A | 6/2008 |

(Continued)

OTHER PUBLICATIONS

Korean Office Action issued by Korean Patent Office on Jan. 11, 2011. Corresponding to Korean Application No. 10-2009-0086306 and "Request for Entry of the Accompanying Office Action" attached herewith.

(Continued)

*Primary Examiner* — Mark F Huff
*Assistant Examiner* — Monique Wills
(74) *Attorney, Agent, or Firm* — Robert E. Bushnell, Esq.

(57) ABSTRACT

A battery pack that includes a bare cell, a bottom case and a resin part disposed on a lower surface of the bare cell. The bottom case has a number of holes. The resin part is disposed on a surface of the bare cell affixing the bottom case to the bare cell. Further, a number of protrusions is provided and composed of the same material as the resin part in which each protrusion corresponds to a hole. The protrusions and the holes have a circular, tetragonal or polygonal cross sectional shape in which upon thermal compression of the protrusions the bottom case is solidly coupled to the resin part.

13 Claims, 3 Drawing Sheets

(56) References Cited

U.S. PATENT DOCUMENTS

2008/0233472 A1* 9/2008 Ota et al. .................. 429/122
2011/0039128 A1* 2/2011 Baek et al. .................. 429/7
2011/0086244 A1* 4/2011 Baek et al. .................. 429/7

FOREIGN PATENT DOCUMENTS

| | | | |
|---|---|---|---|
| EP | 1403942 | A1 | 3/2004 |
| EP | 1487033 | A1 | 12/2004 |
| JP | 11136449 | | 5/1999 |
| JP | 2003308881 | | 10/2003 |
| JP | 2006228714 | | 8/2006 |
| JP | 2006228715 | | 8/2006 |
| KR | 1020030083155 | A | 10/2003 |
| KR | 1020060027272 | A | 3/2006 |
| KR | 100778981 | B | 7/2007 |
| KR | 1020070071249 | A | 7/2007 |
| KR | 10-0778981 | B1 | 11/2007 |
| KR | 1020080068387 | | 7/2008 |
| WO | 2008050956 | A1 | 5/2008 |

OTHER PUBLICATIONS

Cited in attached Japanese Office Action issued by JPO on Jul. 31, 2012 in connection with Japanese Patent Application No. 2010-128784, which also claims Korean Patent Application No. 10-2009-0086306 and Request for Entry of the Accompanying Office Action attached herewith.

Korean Office Action issued by KIPO on Sep. 19, 2011 in connection with Korean Patent Application Serial No. 10-2009-0086306 and Request for Entry of the Accompanying Office Action attached herewith.

European Search Report issued by European Patent Office, dated Nov. 3, 2010, corresponding to European Patent Application No. 10175787.0-2119.

Korean Office Action dated Jan. 11, 2011, corresponding to Korean Patent Application No. 10-2009-0086306.

Chinese Office Action dated Jan. 29, 2013 in connection with Chinese Patent Application No. 201010280800.5 and Request for Entry of the Accompanying Office Action attached herewith.

* cited by examiner

BATTERY PACK

CLAIM OF PRIORITY

This application makes reference to, incorporates the same herein, and claims all benefits accruing under 35 U.S.C. §119 from an application earlier filed in the Korean Intellectual Property Office on Sep. 14, 2009 and there duly assigned Serial No. 10-2009-0086306.

BACKGROUND OF THE INVENTION

1. Field of the Invention

Embodiments relate to a battery pack.

2. Description of the Related Art

Lithium ion secondary batteries may be classified into prismatic secondary batteries, cylinder type secondary batteries, and pouch type secondary batteries, according to their pack structure.

In particular, a pouch type secondary battery may include, as main parts, an electrode assembly and a pouch surrounding the electrode assembly. A protective circuit module and an outer case may be provided to the pouch type secondary battery to be commercialized into a battery pack.

SUMMARY OF THE INVENTION

Embodiments are therefore directed to a battery pack, which substantially overcome one or more of the problems due to the limitations and disadvantages of the related art.

It is therefore a feature of an embodiment to provide a battery pack that improves the coupling force between devices constituting the battery pack.

At least one of the above and other features and advantages may be realized by providing a battery pack including: a bare cell; and a resin part disposed on a lower surface of the bare cell. The resin part may include at least one protrusion on a surface of the resin part, a bottom case may be disposed under the resin part and include a hole at a position corresponding to the protrusion, and the hole may be coupled to the protrusion. The protrusion may be disposed on each of both sides of the resin part. The hole may be disposed on each of both sides of the bottom case. The protrusion may have one of a circular cross section and a polygonal cross section. The hole may be one of a circular hole and a polygonal hole. An adhesive may be applied between the protrusion and the hole.

The protrusion may include: a first sub protrusion coupled to the hole; and a second sub protrusion disposed on the first sub protrusion and compressed to a lower surface of the bottom case. The second sub protrusion may be thermally compressed to the lower surface of the bottom case.

The bottom case may include a recess in a lower surface at a region adjacent to the hole. The protrusion may include: a first sub protrusion coupled to the hole; and a second sub protrusion disposed on the first sub protrusion and compressed to the recess. The second sub protrusion may be thermally compressed to the recess.

The resin part and the protrusion may be formed of one of polyamide and polyurethane. The bottom case may be formed of one of polycarbonate, acrylonitrile butadiene styrene, and a combination thereof. The bottom case may have greater hardness than that of the resin part.

At least one of the above and other features and advantages may be realized by providing a method of manufacturing a battery pack, the method including: preparing a bare cell; forming a resin part, including at least one protrusion, on a lower surface of the bare cell; and coupling a bottom case to a lower surface of the resin part, the bottom case including a hole at a position corresponding to the protrusion, the hole being coupled to the protrusion. The method may further include thermally compressing a portion of the protrusion protruding out of the hole to a lower surface of the bottom case. The protrusion may be compressed by a compression bar having a temperature ranging from about 200° C. to about 250° C.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
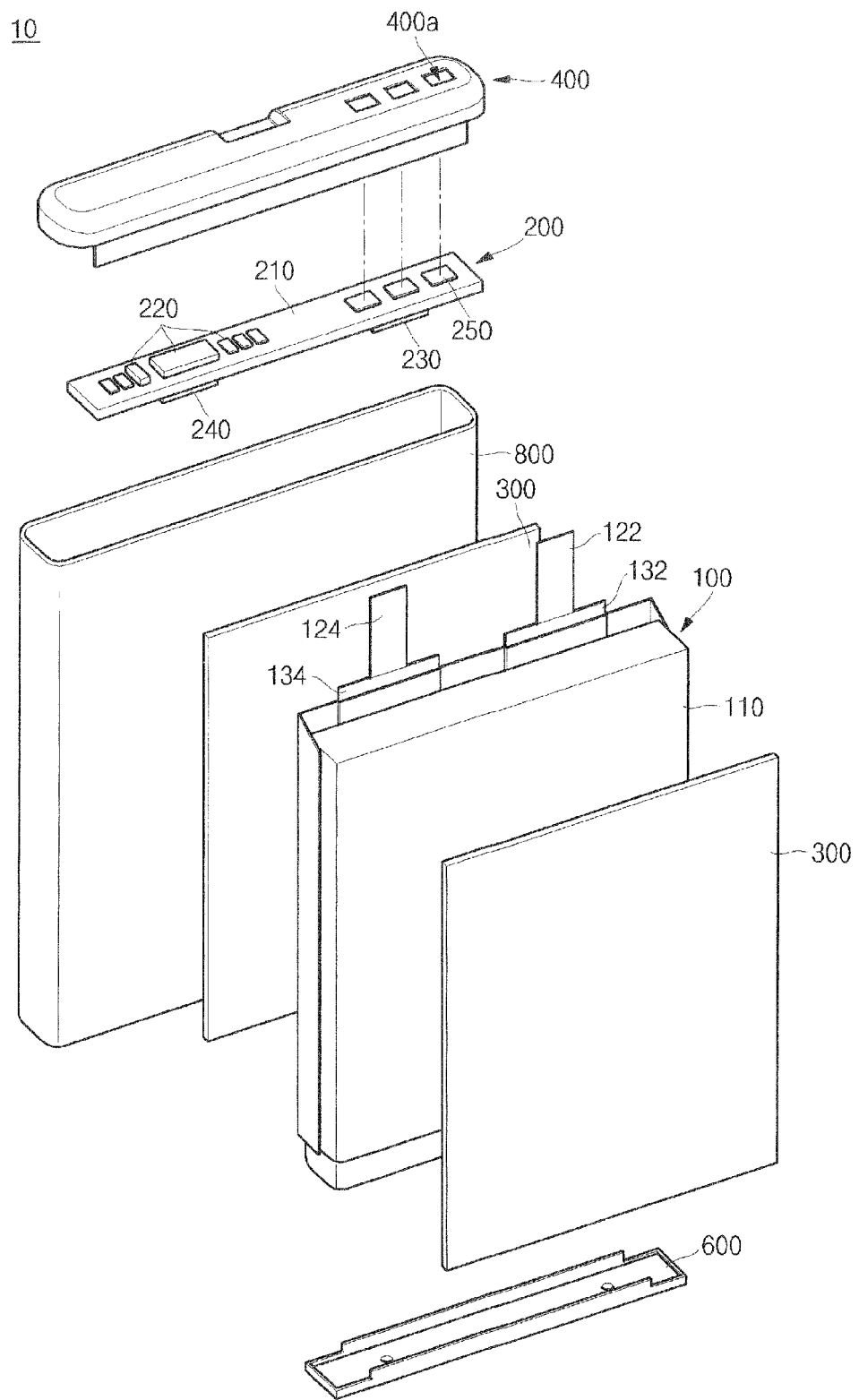
FIG. 1 is an exploded perspective view illustrating a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals denote like elements throughout.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Hereinafter, a battery pack and a method of manufacturing the same in accordance with embodiments will now be described with reference to the accompanying drawings.

Figure 2:
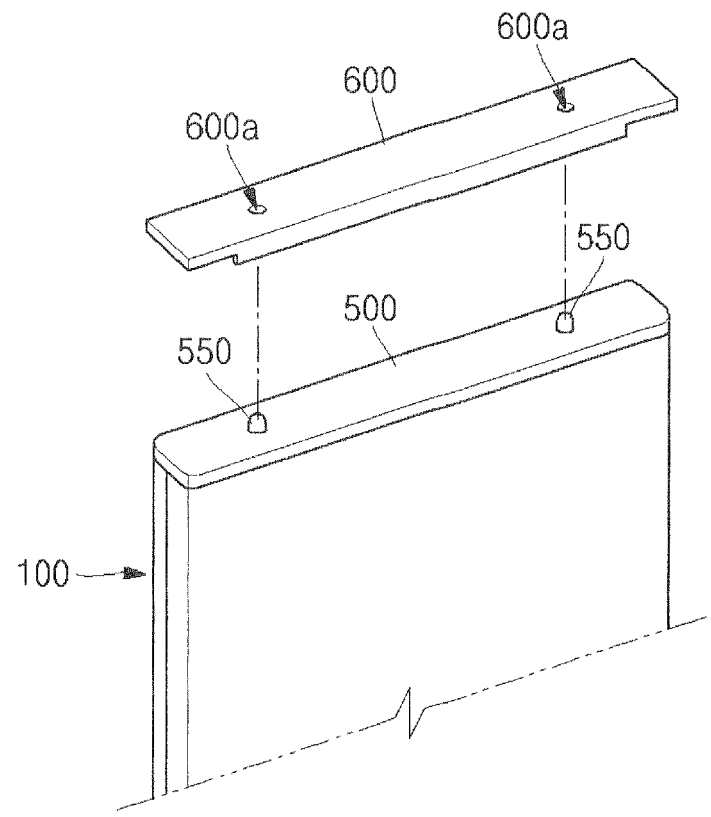
FIG. 2 is a partial perspective view illustrating a battery pack according to an embodiment.
Figure 3:
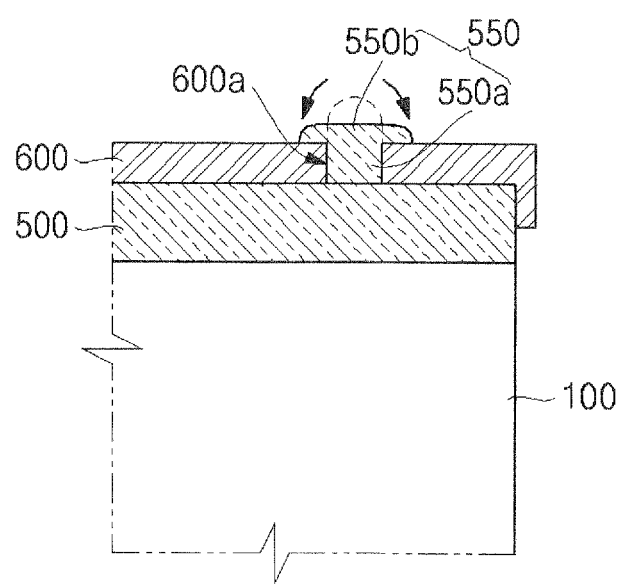
FIG. 3 is a partial cross-sectional view illustrating a battery pack according to an embodiment.

FIGS. 1 through 3 are an exploded perspective view, a partial perspective view, and a partial cross-sectional view illustrating a battery pack 10 according to an embodiment.

Referring to FIGS. 1 through 3, the battery pack 10 may include a bare cell 100, a protective circuit module 200, plates 300, a top case 400, a resin part 500, a bottom case 600, and a label 800. Protrusions 550 disposed on the resin part 500 are coupled to holes 600a disposed in the bottom case 600 to improve the coupling force between the resin part 500 and the bottom case 600.

The bare cell 100 includes an electrode assembly (not shown) and a pouch 110 receiving the electrode assembly.

The electrode assembly includes a first electrode plate (not shown) and a second electrode plate (not shown), and a separator (not shown) interposed between the first and second electrode plates, which are wound in a jelly roll shape. The pouch 110 may enclose the electrode assembly and electrolyte.

A first electrode tab 122 may be disposed on a side of the first electrode plate of the electrode assembly, and a second electrode tab 124 may be disposed on a side of the second electrode plate. The first and second electrode tabs 122 and 124 are parallel to each other with a constant distance in the electrode assembly formed in a jelly roll shape. A portion of the first electrode tab 122 and a portion of the second electrode tab 124 may be exposed out of the pouch 110 to electrically connect the electrode assembly to the protective circuit module 200. The first and second electrode tabs 122 and 124 may be formed of metal such as aluminum, copper, and nickel.

A first insulating tape 132 is disposed between the first electrode tab 122 and the pouch 100, and a second insulating tape 134 is disposed between the second electrode tab 124 and the pouch 100. The first insulating tape 132 is attached to a portion where the first electrode tab 122 is in contact with the pouch 110, and the second insulating tape 134 is attached to a portion where the second electrode tab 124 is in contact with the pouch 110, so as to prevent a short circuit of the first and second electrode tabs 122 and 124 and the pouch 110. Hereinafter, it is assumed that the first electrode plate and the first electrode tab 122 have the positive pole, and the second electrode plate and the second electrode tab 124 have the negative pole. In addition, an 'upper side' and an 'upper surface' are disposed on the side where the first and second electrode tabs 122 and 124 are disposed, and a 'lower side' and a 'lower surface' are disposed on the opposite side from the 'upper side' and the 'upper surface'.

The pouch 110 may have an approximately tetragonal shape and be bent along the longitudinal direction of its short side. A recess, receiving the electrode assembly, is formed in the middle of the pouch 110 through a pressing process. The pouch 110 may be a triple layer including a nylon layer, an aluminum thin layer, and a polyolefin-based resin layer.

The protective circuit module 200 may be disposed on the upper side of the bare cell 100 and electrically connected to the bare cell 100, and include an approximately rectangular plate. The protective circuit module 200 may include a protective circuit substrate 210, protective circuit devices 220, a first lead plate 230, a second lead plate 240, and charge/discharge terminals 250. The protective circuit module 200 may further include a positive temperature coefficient (PTC) device (not shown).

The protective circuit substrate 210 may be disposed on the bare cell 100 and include a rectangular plate. The inside and the lower surface of the protective circuit substrate 210 are provided with a conductive metal pattern (not shown) that is electrically connected to the protective circuit devices 220, the first lead plate 230, the second lead plate 240, and the charge/discharge terminals 250. The protective circuit substrate 210 may be a printed circuit board. A hot melting resin may be injected between the lower surface of the protective circuit substrate 210 and the upper surface of the bare cell 100. The protective circuit substrate 210 is attached to the bare cell 100 through the hot melting resin to solidly form the battery pack 10.

The protective circuit devices 220 may be disposed on the upper surface of the protective circuit substrate 210 and check the charge/discharge state of the bare cell 100, and information about cell currents, cell voltages, and cell temperatures to protect the battery pack 10 from over charge and over discharge.

The first lead plate 230 and the second lead plate 240 may be disposed on the lower surface of the protective circuit substrate 210 at positions corresponding to the first and second electrode tabs 122 and 124, respectively. The first and second electrode tabs 122 and 124 are respectively welded to the first lead plate 230 and the second lead plate 240, and then bent such that the upper surface of the bare cell 100 is parallel to the protective circuit substrate 210, and the protective circuit module 200 is placed on the upper surface of the bare cell 100.

The charge/discharge terminals 250 may be disposed on the upper surface of the protective circuit substrate 210, and function as electrical passages for supplying power to an external electronic device.

The plates 300 may be respectively disposed on two side surfaces of the bare cell 100 having the largest areas, and have tetragonal shapes corresponding to the side surfaces of the bare cell 100. The plates 300 may be coupled to the bare cell 100 through double-sided adhesive tapes between the bare cell 100 and the plates 300. The plates 300 may be formed of stainless (SUS) or aluminum, and protect the bare cell 100 from external shock.

The top case 400 may be disposed on the protective circuit module 200 to protect the protective circuit module 200 from external shock. The top case 400 may include charge/discharge terminal holes 400a at positions corresponding to the charge/discharge terminals 250. The battery pack 10 may supply or receive power from an external electronic device through the charge/discharge terminals 250 exposed through the charge/discharge terminal holes 400a.

The resin part 500 is disposed on the lower surface of the bare cell 100. One or more protrusions 550 may be disposed on a surface of the resin part 500. The bottom case 600 may be disposed on the lower surface of the resin part 500, and include the holes 600a at positions corresponding to the protrusions 550. The holes 600a are coupled to the protrusions 550. The protrusions 550 disposed on the resin part 500 are coupled to the holes 600a disposed in the bottom case 600 to improve coupling force of the battery pack 10. The coupling between the resin part 500 and the bottom case 600 will be described in detail later.

The label 800 may surround the bare cell 100 and the plates 300, and protect the bare cell 100 from external shock and scratches.

Hereinafter, the coupling between the bare cell 100, the resin part 500, and the bottom case 600 will now be described in detail.

The resin part 500 may be disposed on the lower surface of the bare cell 100. The protrusions 550 may be disposed on the surface of the resin part 500. The resin part 500 and the protrusions 550 may be formed of one of polyamide and polyurethane, and may be integrally formed through an injection molding process. The resin part 500 and the protrusions 550 may be formed by solidifying liquid resin melted at a high temperature.

The bottom case 600 is disposed under the resin part 500. The holes 600a of the bottom case 600 may be disposed at the positions corresponding to the protrusions 550, so that the holes 600a are coupled to the protrusions 550. The bottom case 600 may be formed of one of polycarbonate, acrylonitrile butadiene styrene, and a combination thereof.

In more particular, the protrusions 550 may be respectively disposed on both sides of the surface of the resin part 500 facing the bottom case 600, and the holes 600a may be respectively disposed on both sides of the bottom case 600 facing the protrusions 550. Although the number of the protrusions 550 and the number of the holes 600a are two in the current embodiment, the number may be three or greater according to the size of the battery pack 10. The protrusion 550 has a circular or polygonal cross section that may be a tetragonal cross section. The hole 600a may also have a circular, tetragonal or polygonal cross section for coupling to the protrusion 550.

The protrusion 550 may include a first sub protrusion 550a and a second sub protrusion 550b. The first sub protrusion 550a may be disposed in the hole 600a of the bottom case 600 when the resin part 500 and the bottom case 600 are coupled to each other. The second sub protrusion 550b may be disposed on the first sub protrusion 550a, and protrude from the lower surface of the bottom case 600 when the resin part 500 and the bottom case 600 are coupled to each other. After the first sub protrusion 550a is coupled to the hole 600a, the upper portion of the second sub protrusion 550b may be thermally compressed to the surrounding of the hole 600a on the lower surface of the bottom case 600 by a compression bar heated at a temperature ranging from about 200° C. to about 250° C. When the temperature of the compression bar is less than about 200° C., the second sub protrusion 550b does not reach a melting level for heat-welding. Thus, the second sub protrusion 550b may not be compressed to the surrounding of the hole 600a. When the temperature of the compression bar is greater than about 250° C., the fluidity of the second sub protrusion 550b is increased. This may make it difficult to form a predetermined structure for compression.

In the battery pack 10 configured as described above, the first and second sub protrusions 550a and 550b and the bottom case 600 are locked to each other to solidly couple the bottom case 600 to the resin part 500.

Such a resin part may constitute the lower surface of a bare cell of a related art battery pack to protect the lower surface. In this case, the characteristics of the resin part may be varied according to the material of the resin part. When a resin part is formed of material having high hardness, the coupling force between a bare cell and the resin part may be decreased. When a resin part is formed of material having low hardness, the resin part may be distorted by external shock. Thus, the resin part 500 of material having lower hardness than that of the bottom case 600 may be formed on the lower surface of the bare cell 100 to tighten the coupling between the resin part 500 and the lower surface of the bare cell 100, and then, the bottom case 600 of material having higher hardness than that of the resin part 500 may be coupled to the resin part 500. Thus, the distortion of the bottom case 600 due to external shock is effectively prevented, and the coupling between the bare cell 100, the resin part 500, and the bottom case 600 is tightened.

In addition, a related art resin part and a related art bottom case may be coupled to each other through a double-sided adhesive tape disposed between the resin part and the bottom case. However, in this case, since the adhesive force of the double-sided adhesive tape is decreased over time, it may be difficult to permanently couple the resin part to the bottom case. However, according to the current embodiment, the protrusions 550 of the resin part 500 and the holes 600a of the bottom case 600 are locked to each other, and the resin part 500 is permanently coupled to the bottom case 600, thus increasing the service life of the battery pack 10.

Furthermore, adhesive may be applied between the protrusions 550 and the holes 600a to improve the coupling between the resin part 500 and the bottom case 600.

Hereinafter, a battery pack 20 will now be described according to an embodiment. The battery pack 20 is the same as the battery pack 10 except for the coupling structure between the protrusions 550 of the resin part 500 and holes 700a of a bottom case 700. Thus, the structure of the protrusion 550 of the resin part 500, the structure of the bottom case 700, and the coupling therebetween will now be described in detail.

Figure 4:
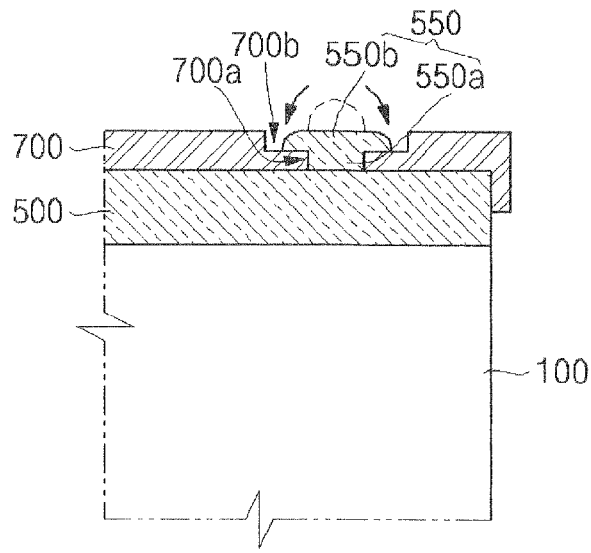
FIG. 4 is a partial cross-sectional view illustrating a battery pack according to another embodiment.

FIG. 4 is a partial cross-sectional view illustrating the battery pack 20.

Referring to FIG. 4, the resin part 500 of the battery pack 20 is disposed on the lower surface of the bare cell 100, and one or more protrusions 550 may be disposed on a surface of the resin part 500. The hole 700a may be disposed at a position of the bottom case 700 corresponding to the protrusion 550, and a recess 700b may be disposed at a region adjacent to the hole 700a.

The protrusion 550 may include the first sub protrusion 550a and the second sub protrusion 550b. The first sub protrusion 550a may be disposed in the hole 700a of the bottom case 700 when the resin part 500 and the bottom case 700 are coupled to each other. The second sub protrusion 550b may be disposed on the first sub protrusion 550a, and protrude from the lower surface of the bottom case 600 when the resin part 500 and the bottom case 700 are coupled to each other. After the first sub protrusion 550a is coupled to the hole 700a, the upper portion of the second sub protrusion 550b may be thermally compressed to the recess 700b around the hole 700a by a compression bar heated at a temperature ranging from about 200° C. to about 250° C.

In the battery pack 20 configured as described above, the first and sub protrusions 550a and 550b and the bottom case 700 are locked to each other to solidly couple the bottom case 700 to the resin part 500.

Since the second sub protrusion 550b is thermally compressed to the recess 700b in the lower surface of the bottom case 700, the second sub protrusion 550b is prevented from protruding from the lower surface of the bottom case 700.

Thus, the volume of the battery pack 20 is decreased, but the capacity of the bare cell 100 is maintained, so as to increase volume energy density of the battery pack 20. In addition, the battery pack 20 has a smooth outer surface, thus facilitating coupling with an external electronic device.

Hereinafter, a method of manufacturing the battery pack 10 will now be described.

Figure 5:
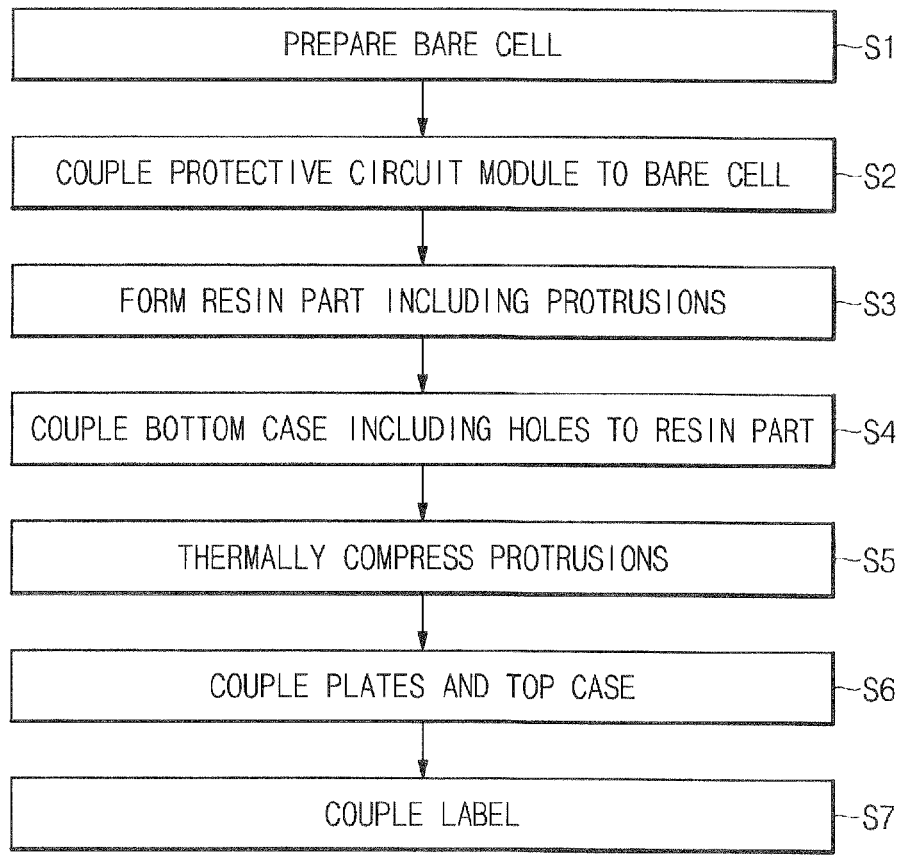
FIG. 5 is a flow chart of a method of manufacturing a battery pack according to an embodiment.

FIG. 5 is a flow chart of the method of manufacturing the battery pack 10.

Referring to FIGS. 1 through 3, and 5, the method of manufacturing the battery pack 10 may include a process 51 of preparing the bare cell 100, a process S2 of coupling the bare cell 100 to the protective circuit module 200, a process S3 of forming the resin part 500 including the protrusions 500, a process S4 of coupling the resin part 500 to the bottom case 600 including the holes 600a, a process S5 of thermally compressing the protrusions 550, a process S6 of coupling the plates 300 and the top case 400, and a process S7 of coupling the label 800.

After the process S1 of preparing the bare cell 100 that includes the electrode assembly and the pouch 110, the upper surface of the bare cell 100 is coupled, in the process S2, with the protective circuit module 200 that includes the protective circuit substrate 210, the protective circuit devices 220, the charge/discharge terminals 250, and the first and second lead plates 230 and 240.

In the process S3, a core pack including the bare cell 100 coupled with the protective circuit module 200 is supplied to a forming device to integrally form the protrusions 550 and the resin part 500 on the lower surface of the bare cell 100. The resin part 500 and the protrusions 550 may be formed of one of polyamide and polyurethane.

In the process S4, the resin part 500 is coupled to the bottom case 600. At this point, the protrusions 550 of the resin part 500 are coupled to the holes 600a of the bottom case 600 since the bottom case 600 includes the holes 600a at the positions corresponding to the protrusions 550 of the resin part 500.

The bottom case 600 may be formed of one of polycarbonate, acrylonitrile butadiene styrene, and a combination thereof.

In the process S5, the portions of the protrusions 550 protruding from the holes 600a are thermally compressed to the lower surface of the bottom case 600. At this point, the portions of the protrusions 550 protruding from the holes 600a may be compressed by a compression bar having a temperature ranging from about 200° C. to about 250° C.

In the process S6, the plates 300 are coupled to the two surfaces of the bare cell 100 having the largest areas through the double-sided adhesive tapes, and the top case 400 is coupled onto the protective circuit module 200. The process S6 may be performed before the process S3.

In the process S7, the bare cell 100 and the plates 300 are surrounded by the label 800.

According to the above embodiments, the protrusions are formed on the resin part disposed on the lower surface of the bare cell, the holes are formed in the case covering the resin part, and then the protrusions are coupled to the holes, so as to improve the coupling force between the case and the resin part.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a bare cell;
   a top case having a plurality of terminal holes for charging and discharging the battery pack disposed on an end of the bare cell;
   a bottom case having a plurality of holes with each hole of the plurality of holes surrounded by a recess in a surface of the bottom case, said bottom case disposed on another end of the bare cell opposite to that of the top case; and
   a resin part disposed between the bare cell and the bottom case, comprising:
      a plurality of protrusions extending from and composed of the same material as the resin part in which each protrusion of said plurality of protrusions corresponds to a hole of said plurality of holes, said plurality of protrusions upon thermal compression solidly couple the bottom case to said resin part,
   wherein after the thermal compression, each of the plurality of protrusions are level with said surface of the bottom case, and
   wherein the bottom case has greater hardness than that of the resin part.

2. The battery pack as claimed in claim 1, wherein the protrusions are disposed on each of both sides of the resin part.

3. The battery pack as claimed in claim 1, wherein the holes are disposed on each of both sides of the bottom case.

4. The battery pack as claimed in claim 1, wherein each of the protrusions comprises:
   a first sub protrusion coupled to the hole; and
   a second sub protrusion disposed on the first sub protrusion and compressed to a lower surface of the bottom case.

5. The battery pack as claimed in claim 4, wherein the second sub protrusion is thermally compressed to the lower surface of the bottom case.

6. The battery pack as claimed in claim 1, wherein each of the protrusions comprises:
   a first sub protrusion coupled to the hole; and
   a second sub protrusion disposed on the first sub protrusion and compressed to the recess.

7. The battery pack as claimed in claim 6, wherein the second sub protrusion is thermally compressed to the recess.

8. The battery pack as claimed in claim 1, wherein an adhesive is applied between each of the protrusions and each of the holes.

9. The battery pack as claimed in claim 1, wherein the protrusions have one of a circular cross section and a polygonal cross section.

10. The battery pack as claimed in claim 1, wherein the holes are one of a circular hole and a polygonal hole.

11. The battery pack as claimed in claim 1, wherein the resin part and the protrusions are formed of one of polyamide and polyurethane.

12. The battery pack as claimed in claim 1, wherein the bottom case is formed of one of polycarbonate, acrylonitrile butadiene styrene, and a combination thereof.

13. The battery pack as claimed in claim 1, wherein a protective circuit module, electrically connected to the bare cell, is disposed between the top case and the bare cell.

* * * * *